United States Patent [19]

Morishita et al.

[11] Patent Number: 4,989,704
[45] Date of Patent: Feb. 5, 1991

[54] OVERRUNNING CLUTCH

[75] Inventors: Akira Morishita; Shuzoo Isozumi, both of Hyogo, Japan

[73] Assignee: Mitsubishi Denki Kabushiki Kaisha, Tokyo, Japan

[21] Appl. No.: 417,116

[22] Filed: Oct. 4, 1989

[30] Foreign Application Priority Data

Oct. 6, 1988 [JP] Japan .......................... 63-131084[U]
Oct. 6, 1988 [JP] Japan .......................... 63-131085[U]

[51] Int. Cl.$^5$ ............................................ F16D 41/06
[52] U.S. Cl. ..................................... 192/45; 192/41 R
[58] Field of Search ..................... 192/45, 41 R, 48.6, 192/48.92

[56] References Cited

U.S. PATENT DOCUMENTS

| | | | |
|---|---|---|---|
| 1,834,843 | 12/1931 | Humfrey | 192/45 |
| 3,523,593 | 8/1970 | Karasick | 192/12 B |
| 3,800,927 | 4/1974 | Takata | 192/45 |
| 4,590,811 | 5/1986 | Kasubuchi | 74/7 E |
| 4,604,907 | 8/1986 | Morishita et al. | 74/7 E |

FOREIGN PATENT DOCUMENTS

| | | | |
|---|---|---|---|
| 899453 | 12/1953 | Fed. Rep. of Germany | 192/45 |
| 543932 | 3/1956 | Italy | 192/48.92 |

50-5054 1/1975 Japan .

*Primary Examiner*—Leslie A. Braun
*Assistant Examiner*—Andrea Pitts
*Attorney, Agent, or Firm*—Sughrue, Mion, Zinn, Macpeak and Seas

[57] ABSTRACT

An overrunning clutch comprising a clutch inner member, a cylindrical member provides at the outer side of the clutch inner member, a clutch outer member provided at the outer side of the cylindrical member, and two circumferential rows of rollers movably disposed between the clutch inner member and the cylindrical member and between the cylindrical member and the clutch outer member. The upper limit value of torque transmitted between the clutch outer member and the cylindrical member through the outer circumferential row of rollers is set so as to be greater than the upper limit value of torque transmitted between the cylindrical member and the clutch inner member through the inner circumferential row of rollers. It is therefore possible to increase the amount of energy absorbed without lowering the upper limit value of transmitted torque. Thus, it is possible to prevent damage to the constituent elements and a consequent lowering of the function of the overrunning clutch.

2 Claims, 4 Drawing Sheets

OVERRUNNING CLUTCH

BACKGROUND OF THE INVENTION

1. Field of the Invention

The present invention relates to an overrunning clutch wherein rollers are circumferentially disposed in two rows which are radially spaced apart from each other.

2. Description of the Prior Art

FIGS. 6 and 7 are sectional views of a typical conventional overrunning clutch for use, for example, in a starting motor. In these figures, the reference numeral 1 denotes an output rotary shaft which is rotatably coupled to the armature of a d.c. motor (not shown). The shaft 1 has a helical spline 1a formed in the outer periphery therof. A clutch outer member 2 of the overrunning clutch is fitted on the shaft 1 through the helical spline 1a. The clutch outer member 2 has tapered cut portions 2a formed in the inner peripheral portion thereof, the cut portions 2a being spaced equally in the circumferential direction, thereby defining wedge-shaped spaces 4 between the clutch outer member 2 and a clutch inner member 3 which is disposed therein. Columnar rollers 5 are movably disposed within the wedge-shaped spaces 4, respectively. Each roller 5 is pressed toward the narrower side of the corresponding space 4 by means of a spring 6. The clutch inner member 3 has a pinion 7 formed integral with it and is supported through a metal sleeve 8 so that it is rotatable as well as slidable relative to the output rotary shaft 1. The reference numeral 9 denotes a plate which covers one side of the overrunning clutch, 11 a cover which is provided over the plate 9 so as to cover the outer side of the overrunning clutch through a packing 10, and 12 a holder which constitutes an engagement member which is engaged with a shift lever (not shown).

The operation of the above-described prior art will next be explained. As the d.c. motor is driven, the output rotary shaft 1 rotates, thus causing the clutch outer member 2 to be driven in the direction of the arrow. As a result, each roller 5 rotates about its own axis and cuts into the narrower portion of the corresponding wedge-shaped space 4, causing a wedge action. Thus, the rollers 5 engage the clutch outer member 2 and the clutch inner member 3 by means of frictional force. Accordingly, the clutch outer member 2, the rollers 5 and the clutch inner member 3 rotate together as one unit and the rotation of the d.c. motor is thereby transmitted to the pinion 7, causing the ring gear of the engine which is meshed with the pinion 7 to be driven, and thus starting the engine. After the engine is started, the pinion 7 is conversely driven by the engine, and when the rotational speed of the clutch inner member 3 exceeds that of the clutch outer member 2, each roller 5 rotates about its own axis and moves toward the wider side of the wedge-shaped space 4. As a result, the clutch outer member 2 and the clutch inner member 3 are disengaged from each other, thereby preventing transmission of the driving force in the reverse direction.

When an impact torque which is greater than the torque generated by the starting motor is generated in the overrunning clutch, for example, when the starting motor is restarted while the starting motor and the engine are rotating by inertia and the pinion 7 is re-engaged with the ring gear of the engine, each roller 5 abuts against the narrower-side wall of the wedge-shaped space 4, thereby allowing the clutch outer member 2 to race relative to the clutch inner member 3 with a torque higher than a predetermined transmitted torque, and thus absorbing the impact torque.

The conventional overrunning clutch suffers, however, from the following problems. Specifically, the angle of torsion with respect to the torque transmitted from the clutch outer member 2 to the clutch inner member 3, that is, the amount of change in the rotational angle difference between the clutch outer member 2 and the clutch inner member 3 when torque is transmitted from the former to the latter, is small. Accordingly, the amount of energy absorbed by torsion is small, so that when the transmitted torque is large, the constituent elements may be damaged or the function of the overrunning clutch may deteriorate. It may be considered to increase the amount of energy absorbed by increasing the angle of torsion between the clutch outer member 2 and the clutch inner member 3. In such a case, however, the upper limit value of transmitted torque, that is, the value of sliding torque, is lowered and therefore it has heretofore been difficult to increase the amount of energy absorbed without lowering the value of sliding torque.

When the above-described re-engagement of the pinion 7 with the ring gear is carried out relatively frequently, even if the impact torque generated is lower than a predetermined transmitted torque with which the clutch outer member 2 and the clutch inner member 3 race relative to each other, the stress that is generated by the rollers 5 cutting into the respective wedge-shaped spaces 4 may exceed the limit of the elastic deformation of the elements constituting the wedge-shaped spaces 4. If this is repeated, the rollers 5 and the elements constituting the wedge-shaped spaces 4 will be deformed or become worn, resulting in a lowering in the transmitting function of the overrunning clutch and a change in the upper limit value of transmitted torque. Thus, the prior art is inferior in its durability.

SUMMARY OF THE INVENTION

In view of the above-described problems of the prior art, it is primary object of the present invention to provide an overrunning clutch which is designed so that the amount of energy absorbed is increased without any lowering in the upper limit of transmitted torque, thereby preventing damage to the constituent elements and consequent lowering of the function of the overrunning clutch and also enhancing its durability.

To this end, the present invention provides an overrunning clutch wherein rollers are circumferentially disposed in two rows which are radially spaced apart from each other.

In one embodiment of the present invention, the upper limit value of torque transmitted between the clutch outer member and a cylindrical member through the outer circumferential row of rollers is set so as to be greater than the upper limit value of torque transmitted between the cylindrical member and the clutch inner member through the inner circumferential row of rollers. Thus, the amount of energy absorbed in the overrunning clutch of the present invention results from the amount of energy absorbed by the combination of the clutch inner member and the cylindrical member and the amount of energy absorbed by the combination of the clutch outer member and the cylindrical member, and the upper limit value of transmitted torque is determined by the upper limit value of torque transmitted between the cylindrical member and the clutch inner member.

In another embodiment of the present invention, the number of rollers in the outer circumferential row is made greater than the number of rollers in the inner circumferential row and the upper limit value of torque transmitted between the clutch outer member and the cylindrical member is set so as to be smaller than the upper limit value of torque transmitted between the cylindrical member and the clutch inner member. Thus, when an abnormal impact is applied to the overrunning clutch, the clutch outer member and the cylindrical member race relative to each other and, even during the racing of these members, the stress of contact between the rollers and the elements constituting the wedge-shaped spaces is kept within the limit of the elastic deformation of the rollers and the constituent elements.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS:

The present invention will be described below in detail with reference to the accompanying drawings.

Figure 1:
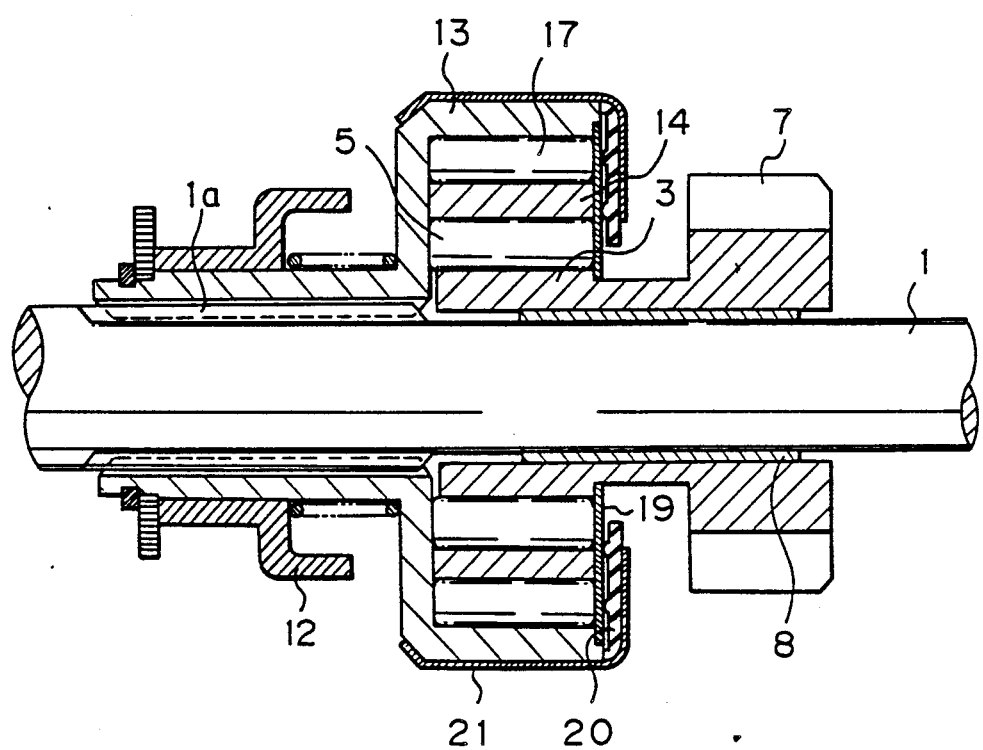
FIG. 1 is a longitudinal sectional view of a first embodiment of the overrunning clutch according to the present invention.
Figure 2:
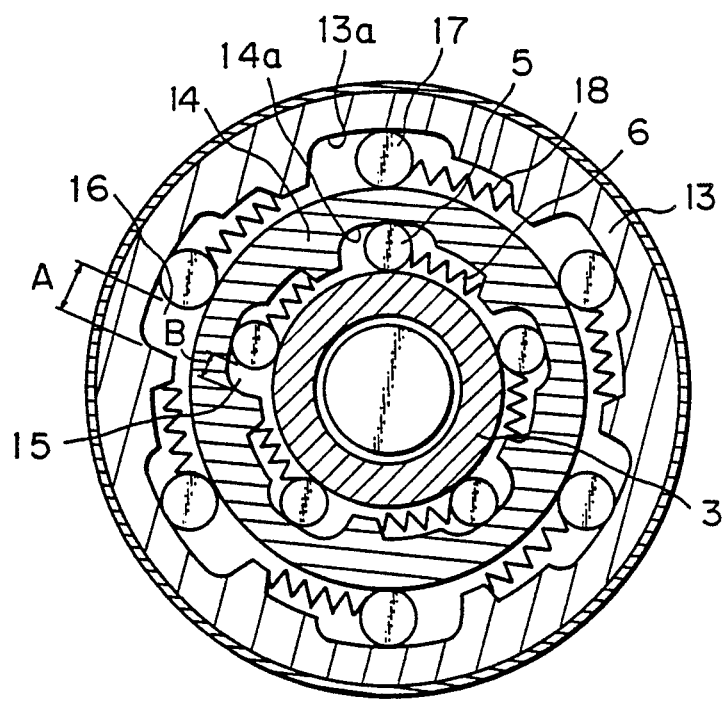
FIG. 2 is a transverse sectional view of the overrunning clutch shown in FIG. 1.

Referring first to FIGS. 1 and 2, which are sectional views of a first embodiment of the overrunning clutch according to the present invention, the reference numeral 13 denotes a clutch outer member which is fitted on an output rotary shaft 1 through a helical spline 1a provided in the outer periphery of the shaft 1 and the numeral 14 denotes a cylindrical member which is provided in a floating state between the clutch outer member 13 and a clutch inner member 3. Between the clutch outer member 13 and the clutch inner member 3 are disposed rollers in two circumferential rows with the cylindrical member 14 interposed therebetween. The cylindrical member 14 has tapered cut portions 14a formed in the inner peripheral portion thereof, the cut portions 14a being spaced equally in the circumferential direction, thereby defining first wedge-shaped spaces 15 between the cylindrical member 14 and the clutch inner member 3. Rollers 5 are movably disposed within the first wedge-shaped spaces 15, respectively, each roller 5 being pressed toward the narrower side of the corresponding space 15 by means of a spring 6. It should be noted that the first wedge-shaped spaces 15 correspond to the wedge-shaped spaces 4 in the prior art and the arrangement made between the cylindrical member 14 and the clutch inner member 3 substantially corresponds to the arrangement made between the clutch outer member 2 and the clutch inner member 3 in the prior art. The outer periphery of the cylindrical member 14 has a cylindrical configuration and the clutch outer member 13 has tapered cut portions 13a formed in the inner peripheral portion thereof, the cut portions 13a being spaced equally in the circumferential direction, thereby defining second wedge-shaped spaces 16 between the clutch outer member 13 and the outer periphery of the cylindrical member 14. Rollers 17 are movably disposed within the second wedge-shaped spaces 16, respectively, each roller 17 being pressed toward the narrower side of the corresponding space 16 by means of a spring 18, in the same way as in the case of the first wedge-shaped spaces 15. The cut portions 13a in the clutch outer member 13 are formed so that the number of second wedge-shaped spaces 16 is greater than the number of first wedge-shaped spaces 15 and further the spacing A between each roller 17 and the narrower-side wall of the corresponding second wedge-shaped space 16, i.e., the travel of the roller 17, is greater than the spacing B between each roller 5 and the narrower-side wall of the corresponding first wedge-shaped space 15, i.e., the travel of the roller 5. It should be noted that the reference numeral 19 denotes a plate which covers one side of the overrunning clutch, 20 a packing, and 21 a cover. Since the arrangements of the other constituent elements are the same as those in the prior art, the corresponding members or portions are denoted by the same reference numerals and the description thereof is omitted.

Figure 3:
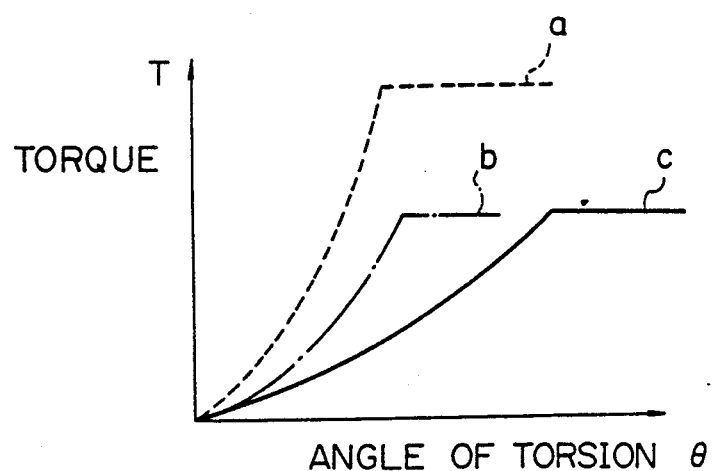
FIG. 3 is a graph showing the relationship between the transmitted torque and the angle of torsion of the overrunning clutch.

The following is a description of the operation of the overrunning clutch having the foregoing arrangement. FIG. 3 is a graph showing the relationship between the transmitted torque T and the angle $\theta$ of torsion of the overrunning clutch, in which the chain line a represents the T-$\theta$ characteristics of the combination of the clutch outer member 13 and the cylindrical member 14, the one-dot chain line b represents the T-$\theta$ characteristics of the combination of the cylindrical member 14 and the clutch inner member 3 and the solid line c represents the T-$\theta$ characteristics of the embodiment resulting from the two T-$\theta$ characteristics. It should be noted that the curve b substantially corresponds to the T-$\theta$ characteristic curve of the conventional overrunning clutch. Since the second wedge-shaped spaces 16 are located at the outer side of the first wedge-shaped spaces 15 and the number of rollers 17 is greater than the number of rollers 5, the slope of the curve a is steeper than the slope of the curve b. In addition, since the travel A of the rollers 17 is greater than the travel B of the rollers 5, the upper limit value of torque transmitted between the clutch outer member 13 and the cylindrical member 14, that is, the value of sliding torque, is greater than that between the cylindrical member 14 and the clutch inner member 3.

Thus, since the overrunning clutch of this embodiment has a relatively great angle of torsion for a given torque, the amount of energy absorbed ($\frac{1}{2}T\theta$) for the same level of torque is relatively large. It is therefore possible to absorb an impact torque and prevent damage to the constituent elements. Since the upper limit value of transmitted torque is determined by the upper limit value of torque transmitted between the cylindrical member 14 and the clutch inner member 3, it is possible to increase the amount of energy absorbed without lowering the upper limit value of transmitted torque in contrast to the prior art.

Figure 4:
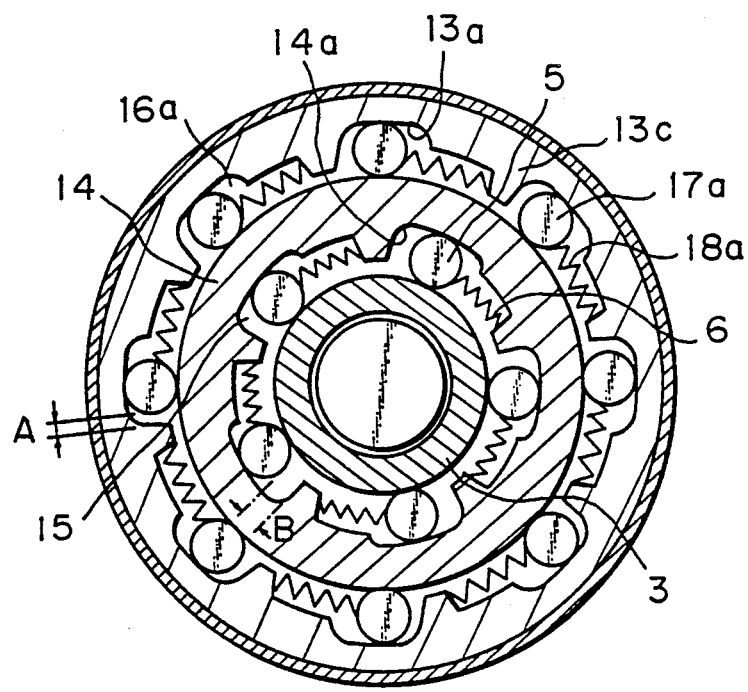
FIG. 4 is a transverse sectional view of a second embodiment of the overrunning clutch according to the present invention.

FIG. 4 is a sectional view of a second embodiment of the overrunning clutch according to the present invention. In this embodiment, the cut portions 13a in the clutch outer member 13c are formed so that the number of second wedge-shaped spaces 16a is greater than the number of first wedge-shaped spaces 15 and further the spacing A between each roller 17a and the narrower-side wall of the corresponding second wedge-shaped space 16a, i.e., the travel of the roller 17a, is smaller than the spacing B between each roller 5 and the narrower-side wall of the corresponding first wedge-shaped space 15, i.e., the travel of the roller 5.

Figure 5:
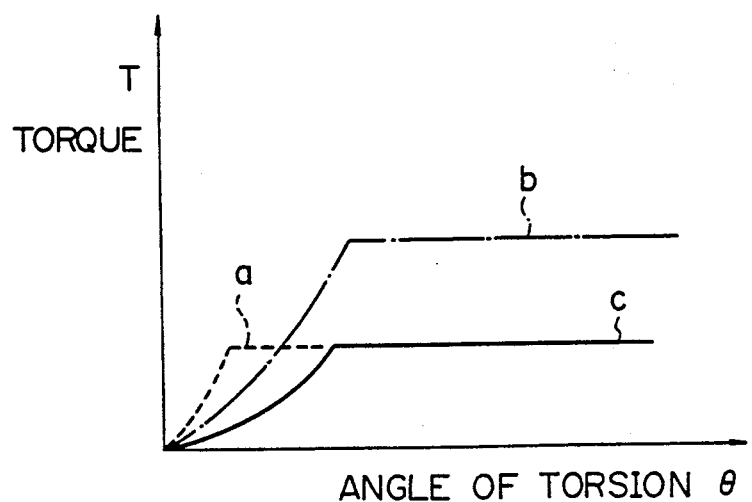
FIG. 5 is a graph showing the relationship between the transmitted torque and the angle of torsion of the overrunning clutch shown in FIG. 4.
Figure 6:
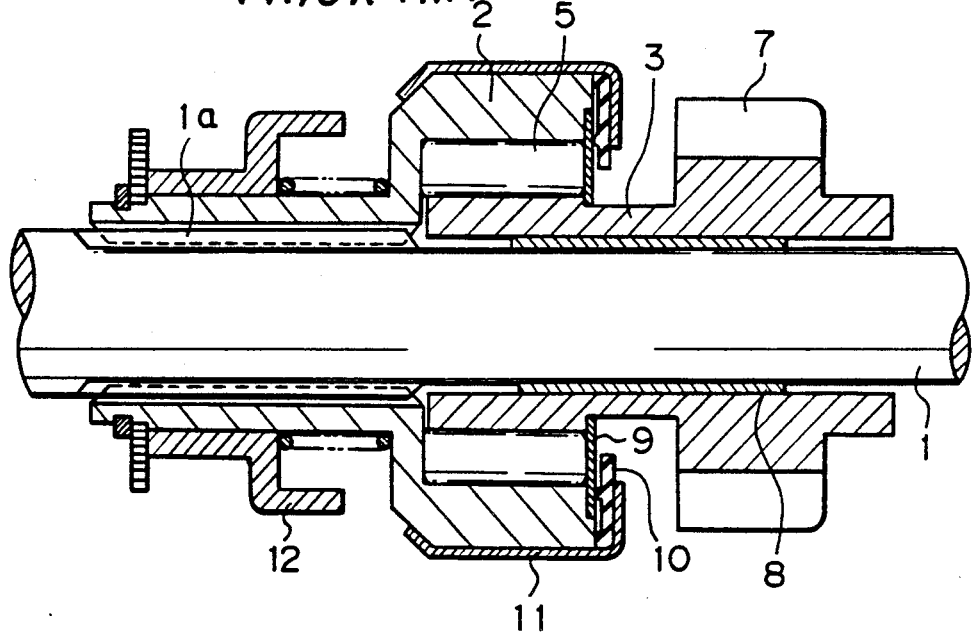
FIG. 6 is a longitudinal sectional view of a conventional overrunning clutch.
Figure 7:
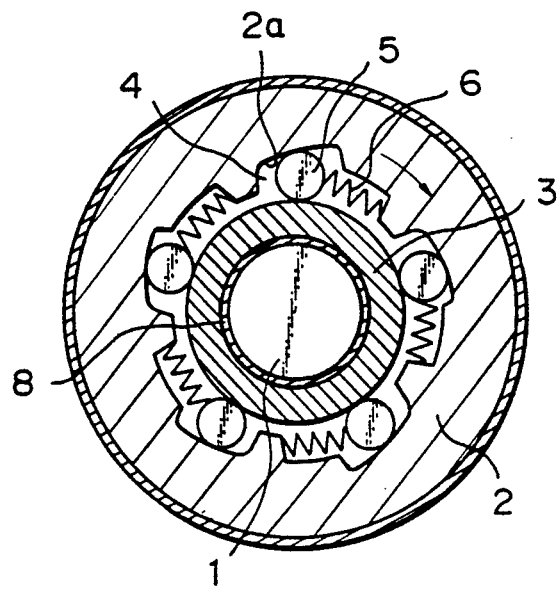
FIG. 7 is a transverse sectional view of the conventional overrunning clutch.

The following is a description of the operation of the overrunning clutch having the foregoing arrangement. FIG. 5 is a graph showing the relationship between the transmitted torque T and the angle $\theta$ of torsion of the overrunning clutch, in which the chain line a represents the T-$\theta$ characteristics of the combination of the clutch outer member 13c and the cylindrical member 14, the one-dot chain line b represents the T-$\theta$ characteristics of the combination of the cylindrical member 14 and the clutch inner member 3 and the solid line c represents the T-$\theta$ characteristics of the embodiment resulting from the two T-$\theta$ characteristics. It should be noted that the curve b substantially corresponds to the T-$\theta$ characteristic curve of the conventional overrunning clutch. Since the travel A of the rollers 17a is smaller than the travel B of the rollers 5 and consequently the upper limit value of torque transmitted between the clutch outer member 13a and the cylindrical member 14 is smaller than that between the cylindrical member 14 and the clutch inner member 3, the upper limit value of overall torque transmitted by the overrunning clutch is determined by the upper limit value of torque transmitted between the clutch outer member 13c and the cylindrical member 14.

Accordingly, when the overrunning clutch is subjected to an impact torque which is higher than the upper limit value of transmitted torque, the clutch outer member 13c and the cylindrical member 14 race relative to each other to thereby absorb the impact torque. In such a case, since the value of the upper limit of transmitted torque (sliding torque) is small and the diameter and number of second wedge-shaped spaces 16a are large, if the impact torque reaches the sliding torque, the stress of contact between the rollers 17a and the elements constituting the second wedge-shaped spaces 16a is small and within the limit of the elastic deformation of these constituent elements. Therefore, even if the overrunning clutch is used in such a condition that an impact torque is frequently applied thereto, there is no fear that the rollers 17a, the clutch outer member 13c and the wall portions of the cylindrical member 14 will become worn or deformed, and the sliding torque is maintained at a constant value. Thus, the overrunning clutch exhibits high durability and therefore can be used for a long period of time.

If the diameter and number of wedge-shaped spaces are increased and the sliding torque is set at a low level, the contact stress can be held within the limit of the elastic deformation in the same way as in the foregoing embodiment; however, in such a case, the amount of change in the angle of torsion with respect to a change in the transmitted torque is small, as shown by the curve a in FIG. 5, so that the amount of energy absorbed ($\frac{1}{2}T\theta$) decreases. In contrast to this, the above-described embodiment not only enables minimization of the contact stress but also permits an increase in the amount of energy absorbed, as shown by the curve c.

Although in the foregoing embodiments the overrunning clutch of the present invention is applied to a starting motor, it should be noted that the application of the overrunning clutch is not necessarily limited thereto and that the same advantageous effects are also obtained in the application to other general devices.

As has been described above, the overrunning clutch according to the present invention is arranged such that the rollers are circumferentially disposed in two rows which are radially spaced apart from each other and the upper limit value of torque transmitted between the clutch outer member and the cylindrical member through the outer circumferential row of rollers is set so as to be greater than the upper limit value of torque transmitted between the cylindrical member and the clutch inner member through the inner circumferential row of rollers. It is therefore possible to increase the amount of energy absorbed without lowering the upper limit value of transmitted torque. Thus, it is possible to prevent damage to the constituent elements and consequent lowering of the function of the overrunning clutch.

When the number of rollers in the outer circumferential row is made greater than the number of rollers in the inner circumferential row and the upper limit value of torque transmitted between the clutch outer member and the cylindrical member is set so as to be smaller than the upper limit value of torque transmitted between the cylindrical member and the clutch inner member, even if the overrunning clutch is used in such a condition that an impact torque is frequently applied thereto, the rollers, the clutch outer member, etc. will not become worn or deformed. Accordingly, the overrunning clutch of the present invention is capable of maintaining stable characteristics over a long period of time. Thus, it is possible according to the present invention to provide an overrunning clutch with an improved durability.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An overrunning clutch, comprising:
   a cylindrical, rotatable clutch inner member (3);
   a cylindrical, rotatable intermediate member (14) surrounding the clutch inner member, said intermediate member having tapered cut portions (14a) formed in an inner periphery thereof so as to define first wedge-shaped spaces (15) between said inner periphery and an outer peripheral surface of said clutch inner member;
   a cylindrical, rotatable clutch outer member (13;13c) surrounding the intermediate member, said clutch outer member having tapered cut portions (13a) formed in an inner peripheral surface thereof so as to define second wedge-shaped spaces (16;16a) between said inner peripheral surface and an outer peripheral surface of said intermediate member; and a plurality of rollers (5,17;17a) individually and movably disposed within said first and second wedge-shaped spaces, respectively, wherein the amounts by which said rollers may advance into said first and second wedge-shaped spaces are limited to first and second predetermined values, respectively, thereby determining an upper limit of transmitted torque in a predetermined direction of rotation, and wherein said intermediate member is a separate, discrete member devoid of connection to any other clutch members except via said rollers, wherein said first predetermined value is smaller than said second predetermined value such that the upper limit value of torque transmitted between said clutch outer member and said intermediate member is greater than the upper limit value of torque transmitted between said intermediate member and said clutch inner member.

2. An overrunning clutch, comprising:

a cylindrical, rotatable clutch inner member (3);

a cylindrical, rotatable intermediate member (14) surrounding the clutch inner member, said intermediate member having tapered cut portions (14a) formed in an inner periphery thereof so as to define first wedge-shaped spaces (15) between said inner periphery and an outer peripheral surface of said clutch inner member;

a cylindrical, rotatable clutch outer member (13;13c) surrounding the intermediate member, said clutch outer member having tapered cut portions (13a) formed in an inner peripheral surface thereof so as to define second wedge-shaped spaces (16;16a) between said inner peripheral surface and an outer peripheral surface of said intermediate member; and a plurality of rollers (5,17;17a) individually and movably disposed within said first and second wedge-shaped spaces, respectively, wherein the amounts by which said rollers may advance into said first and second wedge-shaped spaces are limited to first and second predetermined values, respectively, thereby determining an upper limit of transmitted torque in a predetermined direction of rotation, and wherein said intermediate member is a separate, discrete member devoid of connection to any other clutch members except via said rollers, wherein the number of said second wedge-shaped spaces is greater than the number of said first wedge-shaped spaces, and wherein said first predetermined value is greater than said second predetermined value such that the upper limit value of torque transmitted between said clutch outer member and said intermediate member is smaller than the upper limit value of torque transmitted between said intermediate member and said clutch inner member.

* * * * *